United States Patent [19]

Ramage

[11] 3,976,856

[45] Aug. 24, 1976

[54] SELF-CLOCKING PUNCHED RECORD READER

[75] Inventor: William Ramage, Larkhall, England

[73] Assignee: Honeywell Information Systems Limited, Brentford, England

[22] Filed: Mar. 12, 1975

[21] Appl. No.: 557,701

[52] U.S. Cl. .......................................... 235/61.11 R
[51] Int. Cl.² ........................................ G06K 7/016
[58] Field of Search ............. 235/61.11 E, 61.11 R; 250/555, 566, 567, 568, 569, 570; 179/17 A, 17 B

[56] References Cited
UNITED STATES PATENTS

| 3,248,553 | 4/1966 | Patterson | 250/555 |
| 3,461,305 | 8/1969 | Moulton | 250/570 |
| 3,480,762 | 11/1969 | Del Vecchio | 250/555 |
| 3,586,833 | 6/1971 | Schafer | 235/61.11 E |
| 3,627,990 | 12/1971 | Sallach | 235/61.11 E |
| 3,751,639 | 8/1973 | Searle et al. | 235/61.11 E |

Primary Examiner—Daryl W. Cook
Attorney, Agent, or Firm—Fred Jacob

[57] ABSTRACT

A self-clocking punched record reader for reading a record (10) without sprocket (clock) holes has two sets of sensors (RH1) and (RH2), sensing overlapping areas in the record columns, in a read head (12). A strobe allow flip-flop (SA1) determines when at least one sensor of each set is reading a hole, and a comparator (EQ1) determines when the two sets have identical outputs. The outputs from (SA1) and (EQ1) are combined to fire a one-shot (OS1) which gives a strobe pulse (STR) output, also gating the output from sensor set (RH2) as DATA. An error flip-flop (ER1) is arranged to detect double strobing (DST) and strobe failure (no strobe, (NST).

5 Claims, 2 Drawing Figures

SELF-CLOCKING PUNCHED RECORD READER

The present invention relates to punched record readers, such as readers for perforated tape, cards, or the like and more particularly to those which are capable of reading a punched record without clock (sprocket) holes.

In many types of punched records, such as for example punched tape, the characters or rows of holes across the tape are defined by sprocket holes, which are also often used to drive the tape. By sensing the sprocket holes, it is relatively simple to determine when a character is being read. In some types, however, there are no sprocket holes, and it is then more difficult to determine when a character is being read.

More specifically, such tape may have say 6 columns in which holes may be punched, so that each character consists of between 1 and 6 holes punched in a row across the tape. When reading the character by means of a row of 6 sensors, the sensor outputs will rise at slightly different times because of such matters as tape skew, hole wear, poor hole registration, etc. The character cannot be read until all the holes in it have been sensed, i.e. until the last of the sensor outputs to rise has risen; the character can then be "read" by generating a strobe pulse which gates the sensor signals through to the output. The problem however is to known when to generate the strobe pulse, as there is no identificable event taking place when it should be generated. It is possible to generate it a fixed time after the first sensor signal to rise, but this requires a constant tape speed.

The object of the present invention is to provide a self-clocking punched record reader in which this problem is substantially solved.

Accordingly, the present invention provides a self-clocking punched record reader comprising: two rows of sensors, corresponding sensors in the two rows being arranged to sense areas of the record which are longitudinally displaced but overlapping; a comparator, fed from the two rows of sensors, for determining when the outputs of the two rows of sensors are identical; and strobe signal generating circuitry for generating a strobe signal on detection of such identity.

An embodiment of the invention will now be described by way of example and without limitation, with reference to a punched tape reader as shown in the accompanying drawings, in which.

Figure 1:
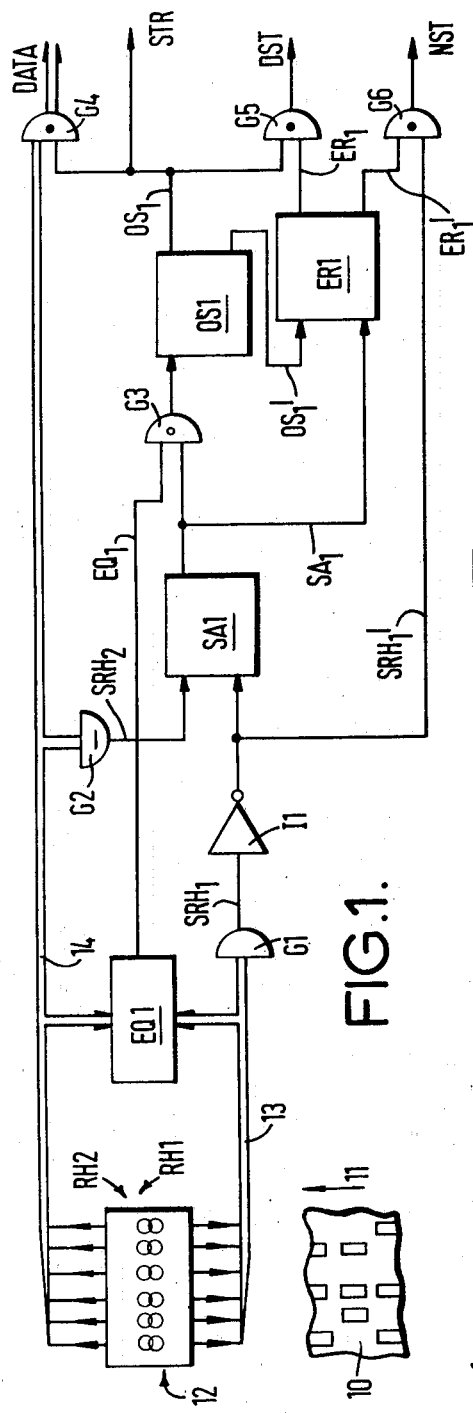
FIG. 1 is a block diagram of the circuitry of a punched tape reader.

Referring to FIG. 1, a tape 10 is shown consisting of a 6 column tape with rectangular holes. This tape is moved in the direction of arrow 11, so as to pass a read head 12. The read head 12 comprises two sets RH1 and RH2 of 6 individual sensors each. The areas sensed by the individual sensors are shown by the small circles in block 12; as can be seen, the sensors of each head are arranged to read the corresponding 6 columns on the tape 10, and the sensors of set RH2 sense areas overlapping the areas sensed by set RH1. The sensors themselves are conventional, and are therefore not shown in detail. Their outputs are amplified and processed by conventional circuitry (not shown) which feeds two 6-bit buses 13 and 14.

Figure 2:
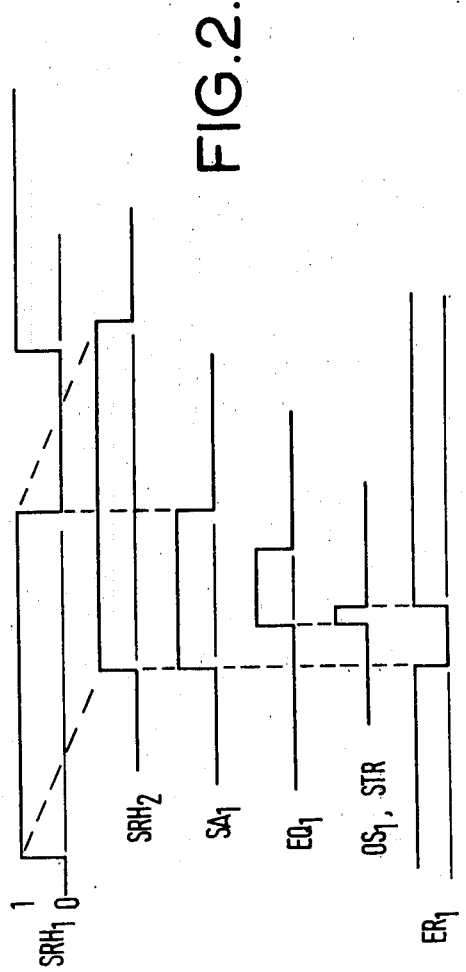
FIG. 2 is a set of waveforms relating to the circuit of FIG. 1.

These two buses feed respective OR gates G1 and G2 which produce true outputs whenever any of the corresponding sensors is sensing a hole. Thus their outputs $SRH_1$ and $SRH_2$ will be substantially as indicated in the first two waveforms of FIG. 2, the two signals being similar but displaced in time. In addition, the two buses 13 and 14 feed a comparator EQ1 which determines when the signals on the two buses are identical. It will be realized that the various sensor outputs will be entirely contained within the signals $SRH_1$ and $SRH_2$, some rising later than others and some falling earlier than others. Hence the time for which equality exists will be contained within the overlap period for which corresponding signals $SRH_1$ and $SRH_2$ are both true, but will be shorter than that period, as is indicated by waveform $EQ_1$.

The overlap period just mentioned is defined by a strobe allow flip-flop SA1. This is set by signal $SRH_2$ and is reset by an inverted signal $SRH_1'$ obtained from gate G1 via inverter 11. (This and other flip-flops and a one-shot respond to the leading edges of true-going signals). The output $SA_1$ (FIG. 2) from this flip-flop defines the overlap period of signals $SRH_1$ and $SRH_2$.

The strobe signal is derived from the output of the comparator. Signal $EQ_1$ is gated by signal $SA_1$ in AND gate G3, which drives a one-shot circuit OS1 whose output $OS_1$ is a pulse signal (FIG. 2) which is used as the strobe signal, and is made available as a system output signal STR. This signal also gates the bus 14 through a set of 6 AND gates G4 to produce system output signals DATA. Thus the output of one of the read heads is gated to the system output when the two read head outputs are identical. The inclusion of flip-flop SA1 and gate G3 ensures that a system output is only produced when a character is being sensed, and not when the tape is blank (which also produces equality of the two read head outputs).

The system shown in also capable of detecting certain faults. An error flip-flop ER1 is provided, and is set by the signal SA1 and reset by the signal $OS_1'$, i.e. is set by the strobe allow signal and cleared when the strobe signal $OS_1$ goes false. If two strobe signals are produced in a single strobe allow period, i.e. if signal EQ1 goes true, false, and then true again during a single strobe allow period, then it will produce two strobe signals from one-shot OS1. Flip-flop ER1 will have been set false (output $ER_1$ false) at the start of the strobe allow period, and true again on the generation of the first strobe signal. Its output $ER_1$ will therefore enable AND gate G5, and the second strobe pulse will pass through this gate to generate a system output signal DST, double strobe, indicative of this fault.

The other output of flip-flop ER1 is used to enable an AND gate G6, which is also fed with signal $SRH_1'$. In normal operation, flip-flop ER1 is only flase for a brief period within the strobe allow signal $SA_1$. If, however, no equality is detected by the comparator EQ1, flip-flop ER1 will be set false at the start of the strobe allow period and will not be set true again. When signal $SRH_1'$ goes true, the last possible moment for generating a strobe signal has passed, and if flip-flop ER1 is still false, gate G6 generates a system output signal NST indicative of no strobe, i.e. of failure to read a character.

Having described the invention, what is claimed as new and novel is:

1. A self-clocking punched record reader comprising: two rows of sensors, corresponding sensors in the two rows being arranged to sense areas of the record which are longitudinally displaced but overlapping; a comparator, fed from the two rows of sensors, for determining when the outputs of the two rows of sensors are identical; and strobe signal generating circuitry for generating a strobe signal on detection of such identity.

2. A record reader according to claim 1 including strobe allow flip-flop fed from the two rows of sensors for determining when at least one sensor in each row is sensing a hole; and gating means controlled by the strobe allow flip-flop for gating the output of the comparator to the strobe signal generating circuitry.

3. A record reader according to claim 2 including an error flip-flop cleared by the strobe allow flip-flop when at least one sensor in each row is sensing a hole, said error flip-flop being set by the generation of a strobe signal.

4. A record reader according to claim 3 including a gate for gating strobe signals when the error flip-flop is set, an output from this gate indicating double strobing.

5. A record reader according to claim 3 including means for generating a signal when on sensor of the leading row is sensing a hole, and a gate for gating this signal when the error flip-flop is cleared, an output from this gate indicating a failure to strobe.

* * * * *

UNITED STATES PATENT OFFICE
CERTIFICATE OF CORRECTION

PATENT NO. : 3,976,856
DATED : August 24, 1976
INVENTOR(S) : William Ramage

It is certified that error appears in the above-identified patent and that said Letters Patent are hereby corrected as shown below:

Column 4, line 10, after "when" delete "on" and substitute therefor --no--.

Signed and Sealed this

First Day of February 1977

[SEAL]

Attest:

RUTH C. MASON
*Attesting Officer*

C. MARSHALL DANN
*Commissioner of Patents and Trademarks*